United States Patent
Robinson, Jr.

(10) Patent No.: US 6,977,825 B2
(45) Date of Patent: Dec. 20, 2005

(54) VOLTAGE REGULATOR USING A TRANSIMPEDANCE BLOCK TO MEASURE OUTPUT

(75) Inventor: Curtis B. Robinson, Jr., Sunnyvale, CA (US)

(73) Assignee: Monolithic Power Systems, Inc., Los Gatos, CA (US)

( * ) Notice: Subject to any disclaimer, the term of this patent is extended or adjusted under 35 U.S.C. 154(b) by 0 days.

(21) Appl. No.: 10/626,994

(22) Filed: Jul. 24, 2003

(65) Prior Publication Data

US 2005/0017700 A1    Jan. 27, 2005

(51) Int. Cl.[7] ............................................. H02M 3/335
(52) U.S. Cl. ..................... 363/21.17; 323/280; 323/284
(58) Field of Search ........................ 363/21.12, 21.09, 363/97, 21.17; 323/280, 284

(56) References Cited

U.S. PATENT DOCUMENTS

| | | | |
|---|---|---|---|
| 5,493,211 A | * | 2/1996 | Baker ........................ 324/130 |
| 5,731,694 A | * | 3/1998 | Wilcox et al. .............. 323/287 |
| 5,777,507 A | * | 7/1998 | Kaminishi et al. .......... 327/514 |
| 5,886,581 A | * | 3/1999 | Hugel et al. ................ 330/308 |
| 6,856,519 B2 | * | 2/2005 | Lin et al. ...................... 363/16 |

OTHER PUBLICATIONS

Author unknown, "LT3420-Photoflash Capacitor Charger with Automatic Refresh," Linear Technology Corporation, 2002, Milpitas, California, US, (16 pages), no month.

* cited by examiner

*Primary Examiner*—Gary L Laxton
(74) *Attorney, Agent, or Firm*—Perkins Coie LLP

(57) ABSTRACT

A method of controlling the output voltage of a voltage regulator that uses a transimpedance block is disclosed. The method comprises measuring the voltage representative current of the output and comparing the voltage representative current to a reference current. Finally, the charging process is stopped if the voltage representative current of the secondary winding is substantially the same as the reference current.

11 Claims, 5 Drawing Sheets

VOLTAGE REGULATOR USING A TRANSIMPEDANCE BLOCK TO MEASURE OUTPUT

TECHNICAL FIELD

This invention relates to a voltage regulator using a transimpedance block to sense the output voltage. The transimpedance block can refer to either an amplifier or a comparator having at least one Norton style input.

BACKGROUND

A voltage regulator is operative to maintain a level output voltage despite variations in power supply voltage or current drawn by a load. These regulators typically output a relatively high voltage, for example in the hundreds of volts, which is then used to power or charge a load. High voltage regulators can be implemented in various forms. These circuits receive as an input a relatively low voltage, typically five volts or less, and output a high voltage. Applications of these high voltage regulators include charging a photoflash capacitor, such as those commonly used in cameras.

In general, the high voltage regulators use a transformer or possibly another similar device to increase the supply voltage to the desired high voltage for driving the load. In general, the transformer has a relatively high turns ratio of ten or greater for typical photoflash applications.

FIG. 1 shows a prior art high voltage regulator used for charging a photoflash capacitor C1. A transformer T1 is used to transform an input power supply voltage $V_{CC}$ into a high voltage output. The current on the secondary side of the transformer T1 flows through a diode D1 to charge the capacitor C1. Various integrated circuitry is used to control the operation of the high voltage regulator. For example, a control section responsive to an enable pin and a charge request pin controls a power switch for delivering power to the transformer T1. In order to determine whether or not the output voltage of the secondary winding of the transformer T1 is at the proper output voltage, the prior art of FIG. 1 measures the back electromagnetic field (EMF) of the primary winding of the transformer T1. This can be used to deduce the output voltage on the secondary winding.

As seen in FIG. 1, after power is applied and a charge request is set, the voltage regulator periodically turns on the power switch until an internal set current is reached in the switch. The primary winding of the transformer T1 inductively kicks up past the positive supply $V_{CC}$ creating a proportionate change in voltage on the secondary. As the voltage on the capacitor C1 increases, the "kicked voltage" (also referred to as "back EMF") on the primary winding of the transformer T1 also increases. The voltage regulator stops charging when the back EMF detected on the primary winding of the transformer T1 reaches a preset level which corresponds to a desired output voltage level. The detection is performed by the voltage comparator in conjunction with the voltage reference. The prior art method of FIG. 1 has an inherent inaccuracy due to the transformer's effective turns ratio.

A second prior art approach is shown in FIG. 2 where a resistor divider formed by resistors R1 and R2 is used. However, this configuration has a disadvantage of leaking charge off of the capacitor C1. This is a disadvantage if the output is meant to hold its voltage between charging cycles. Still another prior art method shown in FIG. 3 uses the resistor divider but with an extra diode from the transformer output. Both methods have either the problem of very slow response for high impedance dividers or the problem of too much loading on the output for low impedance dividers. An additional capacitor will hold the peak long enough for a high impedance divider to measure the output voltage, but high voltage capacitors are costly.

The present invention provides an improved high voltage regulator.

DETAILED DESCRIPTION

In the following description, numerous specific details are provided, such as the identification of various system components, to provide a thorough understanding of embodiments of the invention. One skilled in the art will recognize, however, that the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
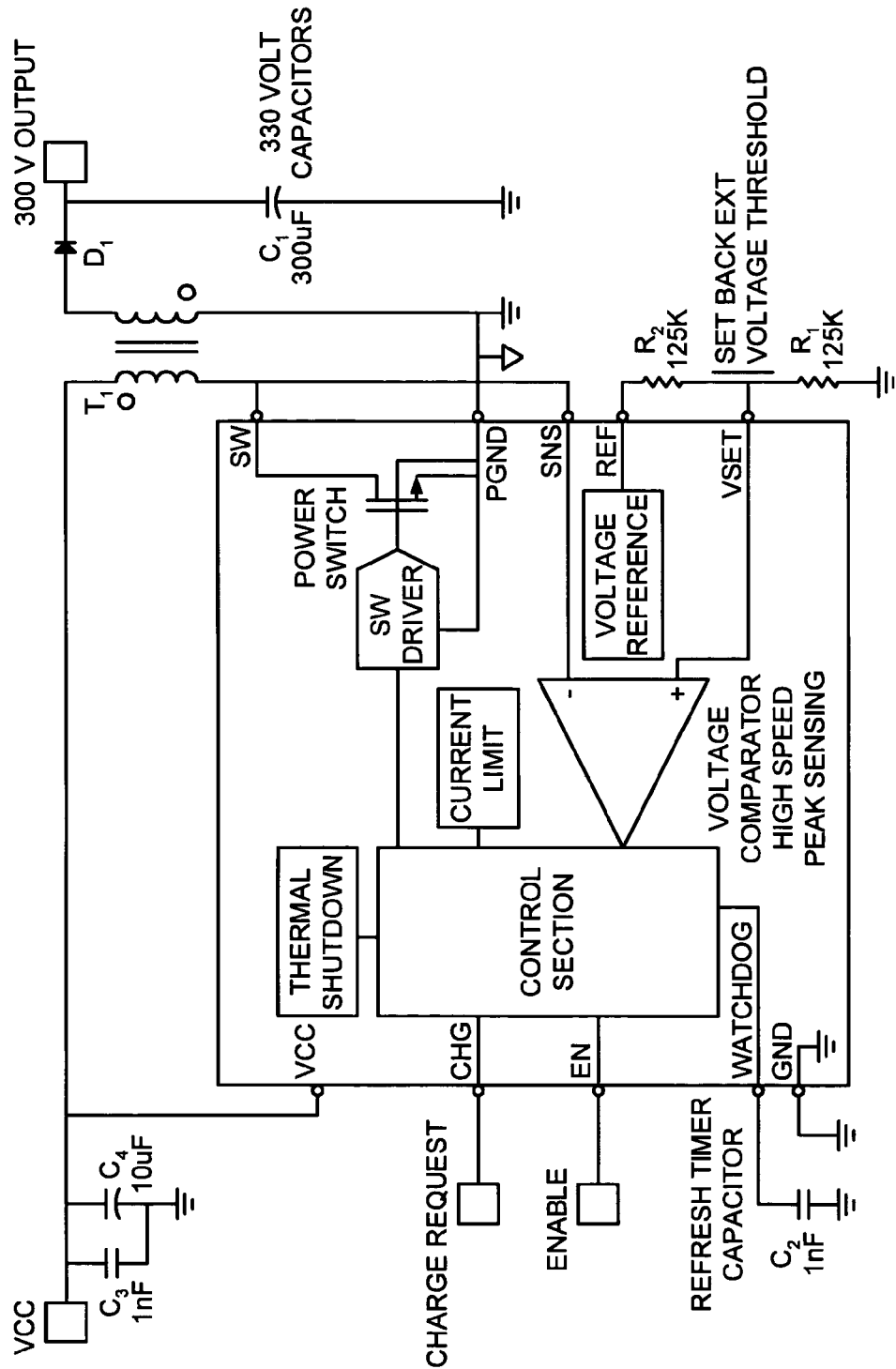
FIGS. 1–3 illustrate prior art high voltage regulators.
Figure 2:
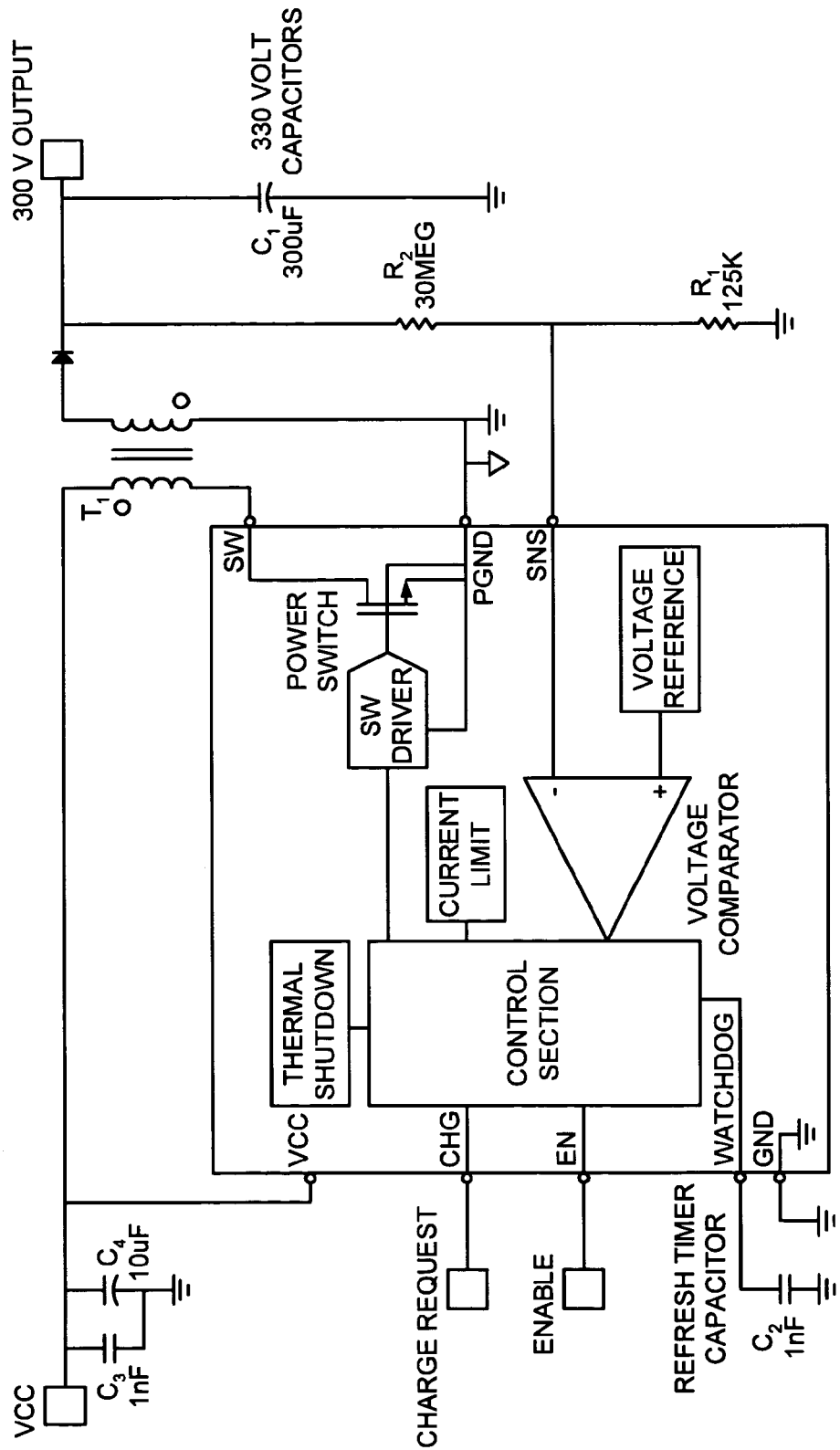
Figure 3:
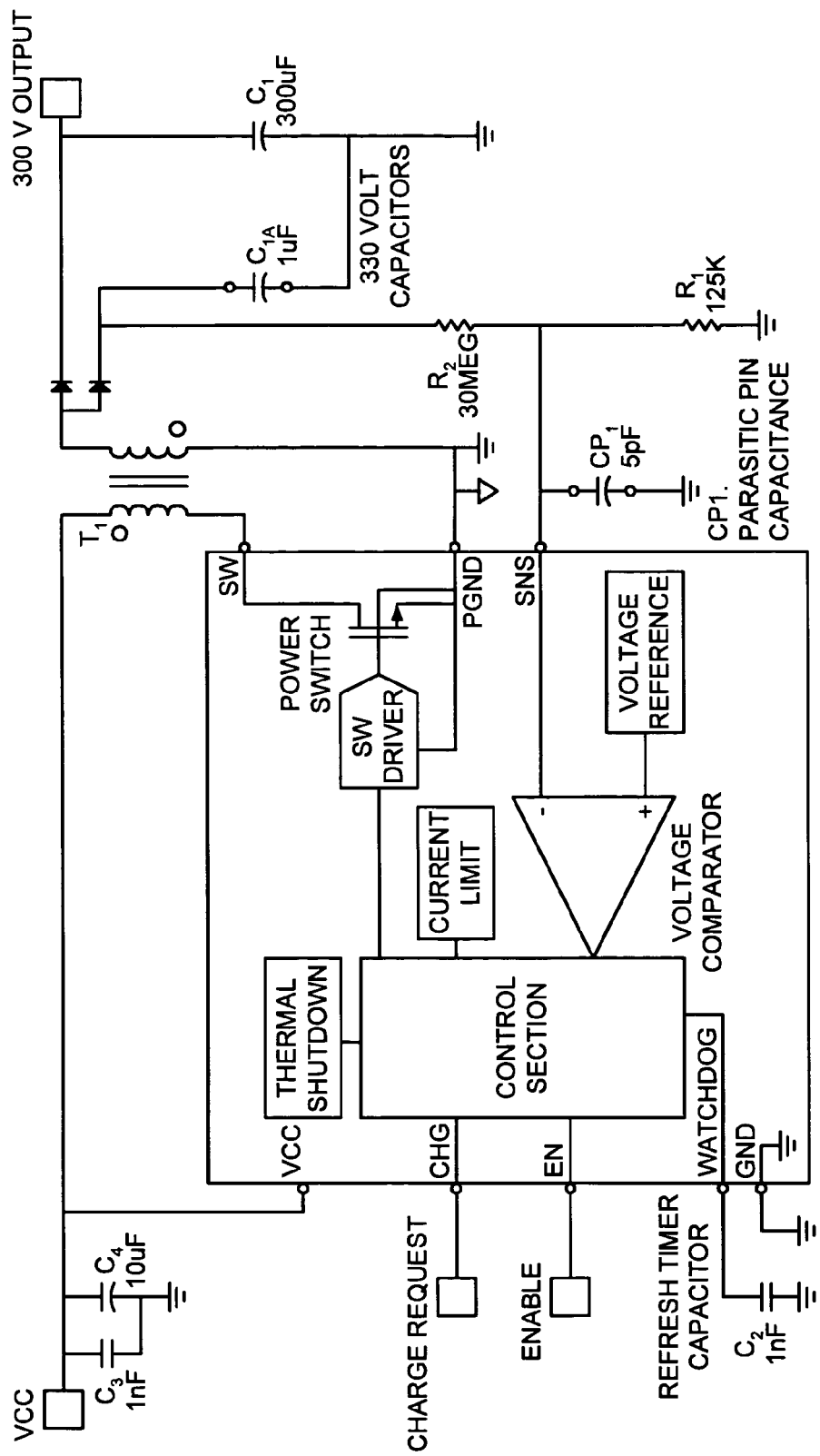
Figure 4:
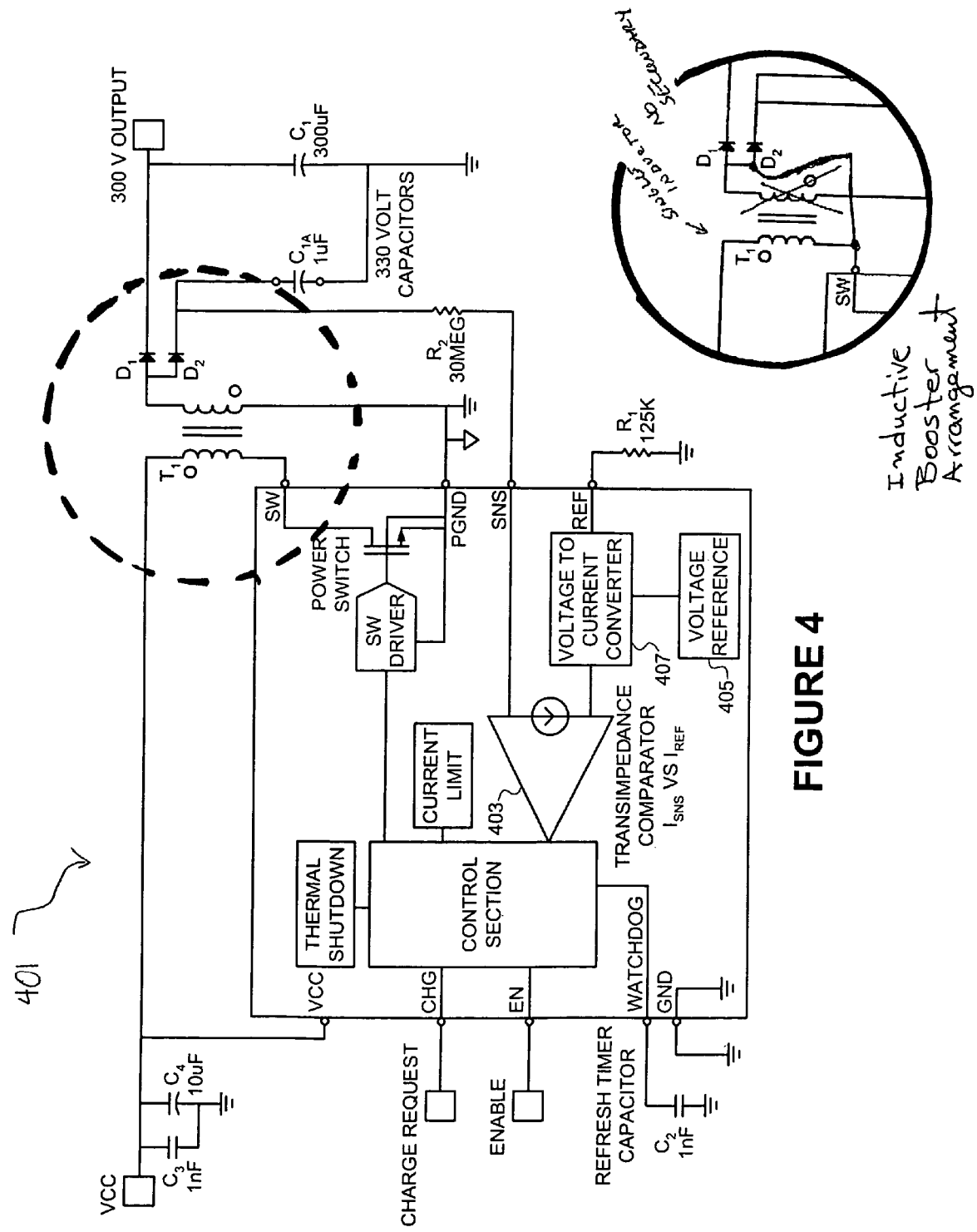
FIG. 4 illustrates a high voltage regulator formed in accordance with the present invention.

FIG. 4 shows a first embodiment of the present invention. As seen, much of the circuitry is similar to that of the prior art of FIGS. 1–3. For the sake of brevity, the conventional aspects of the high voltage regulator 401 are not discussed herein. The present invention is related to monitoring the output voltage.

The high voltage regulator 401 is used to generate a desired high voltage on the secondary winding of the transformer T1. In an alternative embodiment, an inductive boost circuit may replace the transformer T1. The high voltage may be used to drive a load, or in the case shown in FIG. 4, to charge a capacitor C1. As noted above, the capacitor C1 can then be used to fire a photoflash.

The high voltage regulator 401 of the present invention uses a transimpedance block input to measure the voltage at the output side (secondary) of the transformer T1. In this embodiment, a transimpedance block is an amplifier or a comparator with at least one Norton type input that measures current. The sense pin (SNS) of a transimpedance block 403 is connected to the output secondary winding of the transformer T1 through resistor R2 and an optional diode D2. Given that the voltage of the sense pin is set and known, the current in the sense pin (SNS) is an analog representation of the voltage at the other end of R2. The capacitor C1 is charged through the diode D1.

The resistor R2 is chosen to have a relatively high impedance, in this case, 30 Megaohms. A high value for the resistor R2 limits the amount of current flow through resistor R2, and thus power dissipation. For example, if a 300 volt output voltage is desired, the power dissipation through resistor R2 is simply 3 milliwatts, i.e., power=(volt*volt)/resistance. The corresponding current that passes into the sense pin SNS is 10 microamps.

Note that during operation the sense pin SNS presents a low impedance and there is a speed advantage compared to voltage sensing pins that present a high impedance. The scheme can sense the secondary directly or use a diode to match the diode leading to the output capacitor. The transimpedance block 403 acts as a comparator to compare the voltage representative current value from the secondary winding with a reference current value set by a voltage reference 405. During standby, the transimpedance block 403 is disabled and the sense pin SNS is high impedance. Clamps to the low voltage supply rails, usually diodes, protect the sense pin (SNS) in this mode.

A reference resistor R1 is used on the reference pin (REF) and provides a comparison current to use to set the proper output voltage. Thus, the resistor R1 works in conjunction with a voltage reference 405 and voltage to current converter 407 to set the output voltage. The transimpedance block 403 is operative to provide an output to the control section turning off the power switch when the output voltage (indicated by the current flow into the sense pin SNS) has reached a threshold determined by the voltage reference. Thus, when the transimpedance block 403 "sees" that the voltage representative current of the secondary winding is equal to the reference current, the voltage regulator ceases charging.

Figure 5:
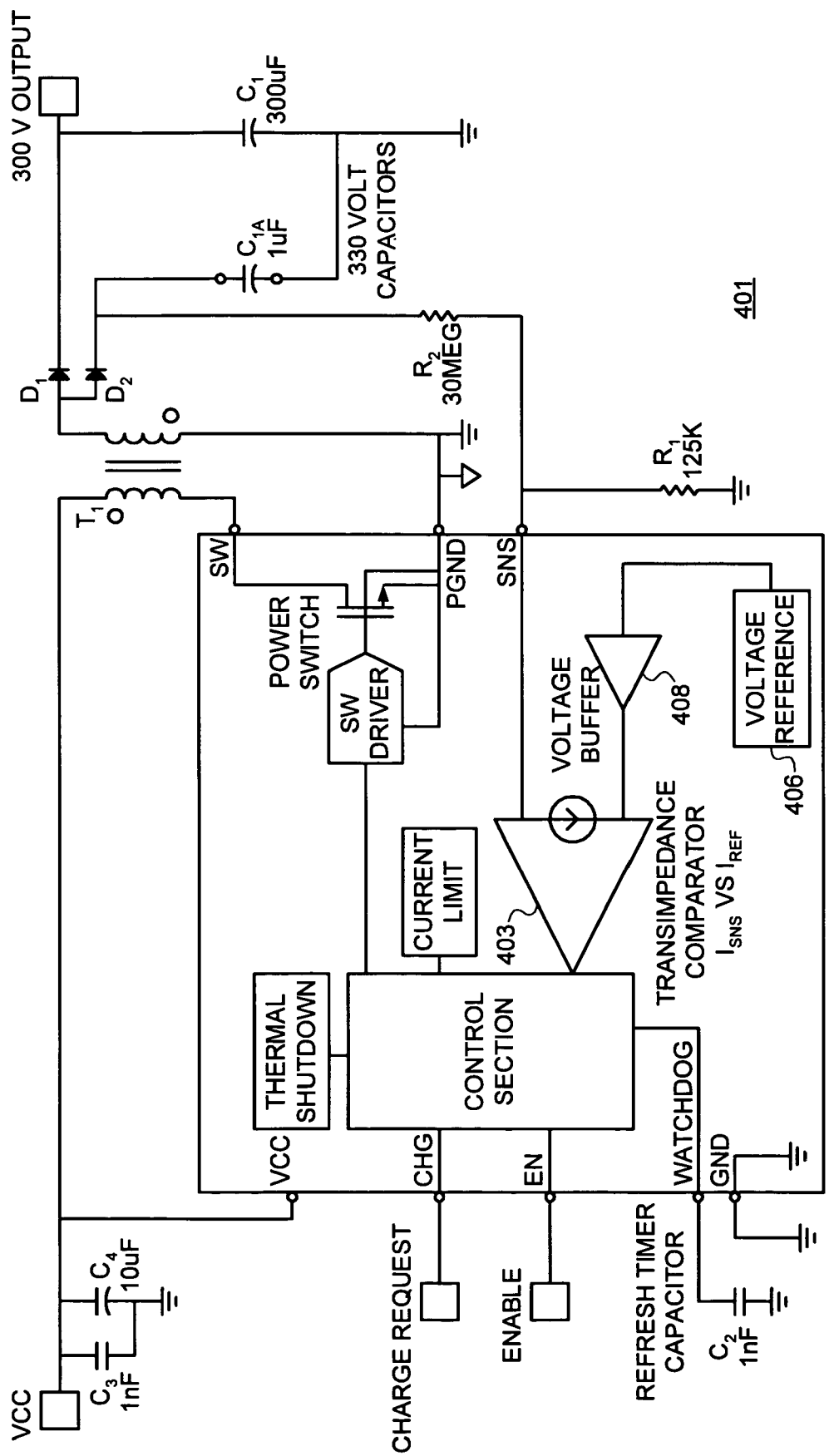
FIG. 5 illustrates an alternative embodiment of a high voltage regulator formed in accordance with the present invention.

Alternatively, FIG. 5 shows a second embodiment which uses the standard resistor divider with a transimpedance block. The transimpedance block 403 has a low input impedance. One of the inputs is set to a voltage reference 406 through a voltage buffer 408. The divider will create a Thevenin source to the source pin SNS creating a positive or negative current in the transimpedance block 403 for an output voltage above or below the set point respectively. When the regulator is at the set voltage, the divider output voltage will match the transimpedance block's reference voltage and there will be no current in the transimpedance block's input. This configuration saves one pin for implementing the comparison current.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

I claim:

1. A method of controlling the output voltage of a voltage regulator using a transimpedance block as an amplifier or a comparator, comprising:

measuring a voltage representative current of said output, wherein the measured current has a predetermined relation with the represented voltage;

comparing said voltage representative current to a reference current; and stopping a charging process of said voltage regulator when said voltage representative current of said output is substantially the same as said reference current.

2. The method of claim 1 wherein said reference current is generated by the use of a voltage reference and a voltage to current converter.

3. The method of claim 1 wherein said reference current is generated by the use of a voltage reference and a reference resistor.

4. The method of claim 1 wherein the measuring of said output further includes the measurement of a current produced by said output through a resistor.

5. The method of claim 1 wherein the measuring of said output further includes the measurement of a voltage representative current produced by a resistive divider connected to said output.

6. The method of claim 1 wherein said voltage regulator uses a transformer to provide said output.

7. The method of claim 1 wherein said voltage regulator uses an inductive booster to provide said output.

8. The method of claim 1 wherein said transimpedance block goes into a high impedance state when in a standby mode.

9. A voltage regulator used in conjunction with a transimpedance block, said voltage regulator operative to monitor an output voltage, said voltage regulator comprising:

a transimpedance block having a reference input and a sense input, said sense input connected to said output through a resistor, said transimpedance block comparing said sense input voltage representative current to the reference input current, indicating that said output voltage is nominal when said sense input current and said reference input current are in a predetermined relation, and wherein the compared sense input current has a predetermined relation with the represented voltage.

10. The voltage regulator of claim 9 further wherein sense input is connected to said output through said resistor and a diode.

11. A voltage regulator used in conjunction with a transimpedance block, said voltage regulator operative to monitor an output voltage, said voltage regulator comprising:

a transimpedance block having a reference input and a sense input, said sense input connected to output through a resistive divider, said transimpedance block comparing said sense input voltage representative current to the reference input current, indicating that said output voltage is nominal when said sense input voltage representative current and said reference input current are in a predetermined relation, and wherein the compared sense input current has a predetermined relation with the represented voltage.

* * * * *